United States Patent
Grey

(10) Patent No.: US 11,439,931 B2
(45) Date of Patent: Sep. 13, 2022

(54) WATER SEPARATING RESIDUE FILTRATION UNIT FOR HIGH-PRESSURE NON-DESTRUCTIVE WATER EXCAVATION

(71) Applicant: AUSTMOSIS HOLDINGS PTY LTD, Hurstville (AU)

(72) Inventor: Stephen Anthony Grey, Hurstville (AU)

(73) Assignee: AUSTMOSIS HOLDINGS PTY LTD, Hurstville (AU)

( * ) Notice: Subject to any disclaimer, the term of this patent is extended or adjusted under 35 U.S.C. 154(b) by 0 days.

(21) Appl. No.: 17/266,725

(22) PCT Filed: Aug. 5, 2019

(86) PCT No.: PCT/AU2019/050815
§ 371 (c)(1),
(2) Date: Feb. 8, 2021

(87) PCT Pub. No.: WO2020/028938
PCT Pub. Date: Feb. 13, 2020

(65) Prior Publication Data
US 2021/0308603 A1   Oct. 7, 2021

(30) Foreign Application Priority Data
Aug. 6, 2018 (AU) .................. 2018902847

(51) Int. Cl.
*B01D 29/23* (2006.01)
*B01D 21/00* (2006.01)

(52) U.S. Cl.
CPC ......... *B01D 29/23* (2013.01); *B01D 21/0012* (2013.01); *B01D 2201/0415* (2013.01); *B01D 2201/10* (2013.01); *B01D 2201/301* (2013.01)

(58) Field of Classification Search
CPC .... B01D 21/0012; B01D 29/23; B01D 29/27; B01D 2201/301
(Continued)

(56) References Cited

U.S. PATENT DOCUMENTS

| | | |
|---|---|---|
| 4,871,454 A | 10/1989 | Lott |
| 4,929,353 A | 5/1990 | Harris |

(Continued)

FOREIGN PATENT DOCUMENTS

| | | |
|---|---|---|
| DE | 3231186 A1 | 4/1983 |
| WO | 1999045214 A1 | 9/1999 |
| WO | 2009092131 A1 | 7/2009 |

OTHER PUBLICATIONS

International Search Report & Written Opinion dated Oct. 14, 2019 from PCT Application No. PCT/AU2019/050815.

*Primary Examiner* — Christopher Upton
(74) *Attorney, Agent, or Firm* — Innovation Capital Law Group, LLP; Vic Lin

(57) ABSTRACT

A water separating residue filtration unit has an outer container has container walls surrounding a container floor. A screen is located within the container, the screen having a screen floor supported above the container floor thereby defining an inner void between the screen floor and the container floor and at least one drain drains from the inner void and an exterior of the container. A fabric filtration liner covers the screen. Non-destructive high-pressure water excavation residual liquid slurry may be pumped into the unit, allowed to settle such that water filters therefrom through the fabric filtration liner and the screen whereafter the unit having residual content therein may be transported for dumping.

20 Claims, 3 Drawing Sheets

(58) Field of Classification Search
USPC ................................ 210/455, 477, 484, 485
See application file for complete search history.

(56) References Cited

U.S. PATENT DOCUMENTS

| | | | | |
|---|---|---|---|---|
| 5,589,081 | A * | 12/1996 | Harris | B01D 29/23 |
| | | | | 210/455 |
| 6,086,758 | A * | 7/2000 | Schilling | B01D 29/27 |
| | | | | 210/485 |
| 6,146,528 | A * | 11/2000 | Caughman, Jr. | B01D 29/23 |
| | | | | 210/484 |
| 6,258,268 | B1 * | 7/2001 | Lake | B01D 29/35 |
| | | | | 210/484 |
| 7,112,274 | B1 | 9/2006 | Sanguinetti | |
| 7,410,576 | B2 * | 8/2008 | Brouillard | B01D 29/23 |
| | | | | 210/455 |
| 7,883,620 | B2 * | 2/2011 | Owen | E03C 1/26 |
| | | | | 210/455 |
| 9,611,636 | B2 * | 4/2017 | Hetcher | B01D 29/56 |
| 2004/0011749 | A1 | 1/2004 | Hutchinson et al. | |
| 2020/0030721 | A1 * | 1/2020 | Ros | B01D 21/0012 |

* cited by examiner

WATER SEPARATING RESIDUE FILTRATION UNIT FOR HIGH-PRESSURE NON-DESTRUCTIVE WATER EXCAVATION

FIELD OF THE INVENTION

This invention relates generally to a water separating residue filtration unit for use during high-pressure non-destructive water excavation.

BACKGROUND OF THE INVENTION

Non-destructive water excavation uses high-pressure water injection and vacuum suction for forming holes in the ground. This type of excavation is preferred for being less destructive on any buried services as compared to conventional mechanised drilling.

Liquid content slurry sucked from the excavation is pumped into a specialised tanker, which is periodically driven off site for disposal.

The present invention seeks to provide an alternative arrangement, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided a water separating residue filtration unit comprising an outer container having container walls surrounding the container floor. A false floor is located within the container which supports a mesh screen. The screen has a screen floor supported above the container floor, thereby defining an inner void between the screen floor and the container floor. The container comprises at least one drain from the inner void and an exterior of the container.

A fabric filtration liner is inserted within the unit to cover the screen.

As such, residual liquid content slurry sucked during high-pressure non-destructive water excavation can be pumped into the container and allowed to settle. The liquid content of the slurry seeps through the fabric filtration liner and the screen into the void and exits the drain.

The unit having residual content therein may then be hoisted atop a flatbed refuse truck for transporting the residual content for dumping.

The separation of water from the slurry reduces weight, thereby saving transportation costs.

Furthermore, the present container may be hoisted atop a conventional flatbed refused truck for transportation, avoiding use of specialised slurry tankers.

In embodiments, the container may be trapezoidal, assisting dislodgement of residual content therefrom when tipping.

In embodiments the drains may be located at corners or ends of the container floor, thereby allowing for drainage irrespective of the orientation of the container on a slope.

One or more collection hoses may collect residual water from the drains to be recycled during the excavation process, thereby reducing water wastage.

The fabric filtration liner may be nonwoven geotextile fabric having specific properties disclosed herein which were found advantageous for the present application.

According to one aspect, there is provided a water separating residue filtration unit comprising an outer container having container walls surrounding a container floor, a screen located within the container, the screen having a screen floor supported above the container floor, thereby defining an inner void between the screen floor and the container floor, at least one drain from the inner void and an exterior of the container and a fabric filtration liner covering the screen.

The at least one drain may comprise at least two drains located at opposite sides of the container floor.

The container floor may be rectangular and wherein the at least one drain may comprise four drains located at opposite corners of the container floor.

The water separating residue filtration unit may further comprise engagements at a rim of the container to engage edges of the filtration liner.

The edges of the filtration liner may comprise eyelets for removeable engagement of the engagements.

The container walls may be planar and wherein the container may have a trapezoidal cross section narrowing towards the container floor.

The screen may have planar screen walls surrounding the screen floor, the screen walls at least partially covering inner surfaces of respective container walls.

The screen floor may be smaller than the container floor and the screen walls may be spaced away from respective inner surfaces of the container walls at the screen floor and converge to meet the respective inner surfaces towards the rim of the container.

The water separating residue filtration unit may further comprise a supportive framework located between the screen floor and the container floor.

The supportive framework may comprise an orthogonal arrangement of longitudinal and cross bars.

The supportive framework may have a gap less than 30 cm between at least one of adjacent crossbars and longitudinal bars.

The water separating residue filtration unit may further comprise a container lid, the container lid comprising a central panel in at least one end panel upwardly pivotable from the central panel.

The at least one end panel may comprise two end panels located oppositely with respect to the central panel.

The water separating residue filtration unit may further comprise at least one collection hose couple to the at least one drain.

The water separating residue filtration unit may further comprise a gasket interfacing an inner surface of the container wall and an edge of the at least one end panel.

The water separating residue filtration unit may further comprise a locking pin between a rim of the container and the at least one end panel.

The fabric filtration liner may comprise nonwoven geotextile fabric.

According to another aspect, there may be provided a method of utilisation of a water separating residue filtration unit during high-pressure non-destructive water excavation as described herein, the method comprising inserting the fabric filtration liner to cover the screen, pumping non-destructive high-pressure water excavation residual liquid slurry into the unit, allowing the slurry to settle such that water filters therefrom through the fabric filtration liner and the screen, transporting the unit to a dump and to be in the residual contents therefrom.

The water separating residue filtration unit may further comprise recycling the water from the at least one drain for the non-destructive high-pressure water excavation.

The geotextile fabric may comprise at least one of a California bearing ratio (CBR) burst strength of greater than 1750 N and a flowrate @ 100 mm head of greater than 165 l/m²/s.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
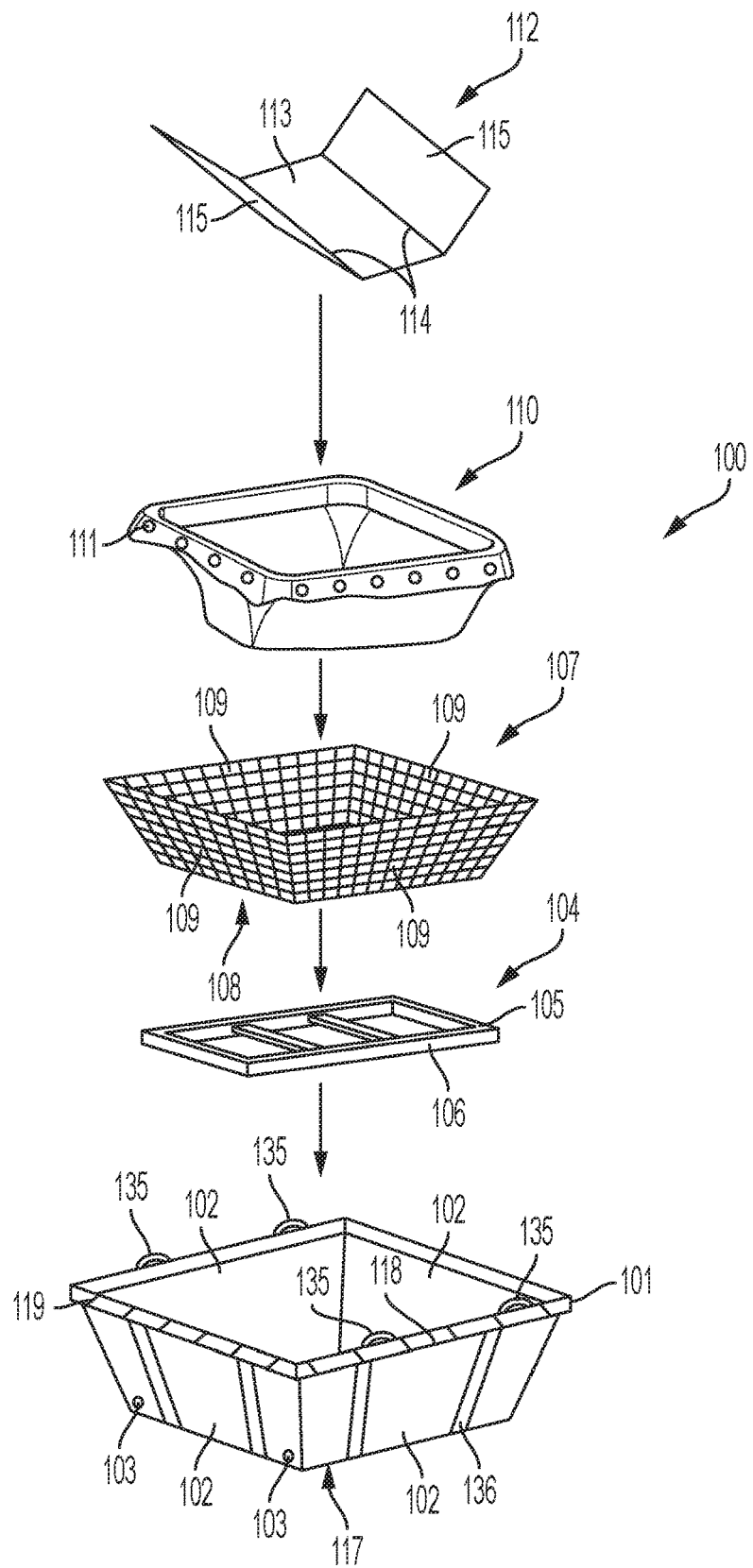
FIG. 1 shows a water separating residue filtration unit in accordance with an embodiment.

A water separating residue filtration unit 100 comprises an outer container 101 having container walls 102 surrounding a container floor 117. A screen 107 is located within the container. The screen 107 may comprise a wire mesh or perforated sheet-metal thereby defining a plurality of apertures therethrough. The screen 107 has a screen floor 108 supported above the container floor 117, thereby defining an inner void 120 between the screen floor 108 and the container floor 117. The container 101 further comprises at least one drain 103 from the inner void 120 and an exterior of the container 101.

The unit 100 further comprises a fabric filtration liner 110 which covers the screen 107. The fabric filtration liner 110 may comprise nonwoven geotextile fabric made of polypropylene or polyester.

Trial and experimentation indicate the following mechanical and hydraulic properties of the nonwoven geotextile fabric to be advantageous for the present application:

|  |  | Range | Preferable |
|---|---|---|---|
| Mechanical properties | Wide strip tensile strength (kN/m) | 9-18.5 | 14 |
|  | Wide strip toughness (kJ/m²) | 1.6-3.5 | 2.7 |
|  | Grab tensile strength (N) | 600-1270 | 850 |
|  | Trapezoid tear strength (N) | 240-440 | 345 |
|  | California bearing ratio (CBR) burst strength (N) | 1750-3400 | 2500 |
|  | G rating | 1300-2510 | 1900 |
| Hydraulic properties | Pore Size ($O_{95}$) (μm) | 75-110 | 80 |
|  | Permittivity ($s^{-1}$) | 1.6-3.2 | 1.8 |
|  | Coefficient of permeability (m/s × $10^{-4}$) | 43 | 43 |
|  | Flow rate @ 100 mm Head (l/m²/s) | 165-320 | 180 |

In embodiments, the unit 100 may comprise a container lid 112 which may comprise a central panel 113 and at least one end panels 115 upwardly pivotable from respective hinges 114 at edges of the central panel 113.

In embodiments, a supportive framework 104, which may comprise an orthogonal arrangement of longitudinal bars 106 and cross bars 105 may interface between the screen floor 108 and the container floor 117, thereby supporting the screen floor 108 from the weight of slurry 116 thereatop.

In embodiments, the framework 104 may not have gaps of greater than 300 mm between adjacent bars 105, 106.

The container 101 may comprise lifting lugs 135 for hoisting atop a flatbed refuse truck for transportation.

The container 101 may comprise metal may comprise side bracing 136 to support the sidewalls 102.

In a preferred embodiment, the container 101 is substantially rectangular and comprises a trapezoidal cross-section in that the sidewalls 102 angle inwardly towards the container floor 117. As such, the screen floor 108 may be similarly rectangular yet smaller than the container floor 117.

The screen 107 further preferably comprises a planar screen walls 109 which cover inner surfaces of the container sidewalls 102.

Figure 2:
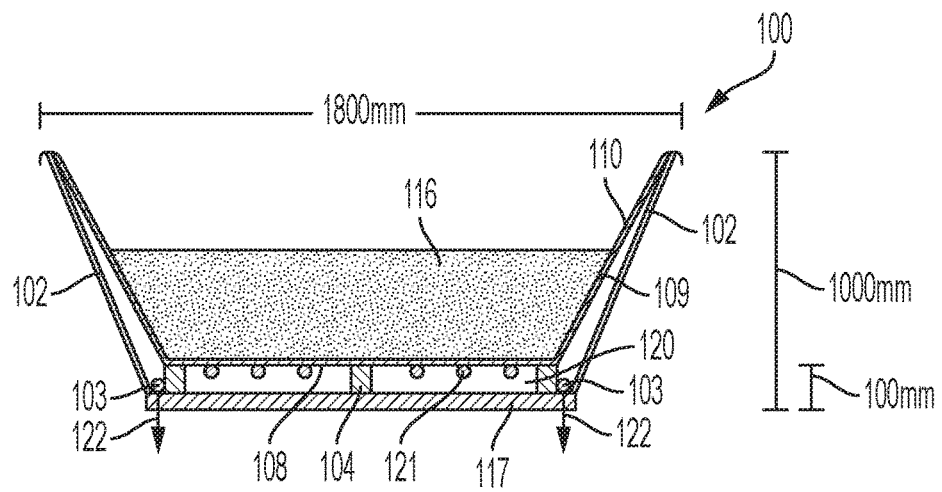
FIG. 2 shows an end cross-sectional view of the unit in accordance with an embodiment.

With reference to the end cross-sectional view of FIG. 2, there is shown the screen floor 108 located above the container floor 117 by the supportive framework 104. The screen sidewalls 109 may fall to meet respective edges of the screen floor 108 but may converge towards and attached to inner surfaces of the container sidewalls 102 towards the rim 118 of the container 101.

FIG. 2 shows the fabric filtration liner 110 covering the screen sidewalls 109 floor 108.

Liquid slurry 116 is poured into the unit 101 wherein the fabric filtration liner 110 and the screen 107 cooperate to filter filtered water 121 therefrom which seeps or drips into the interior void 120 and which escapes as liquid outlet flow 120 from the drains 103.

In a preferred embodiment, the drains 103 are located at opposite sides of the container. In further preferred embodiment, the container 101 comprises four drains 103, each located at a respective corner of the container floor 117.

The container 101 may comprise a width of between 1.5 and 2 m, such as approximately 1800 mm as is illustrated in FIG. 2. Furthermore, the height of the container may be between 1.5 and 2 m, such as approximately 1 m.

The interior volume of the container may be between 4 and 8 m³ such as approximately 6 m³.

The offset between the screen floor 108 and the container floor 117 may between five and 20 cm such as approximately 10 cm.

Figure 3:
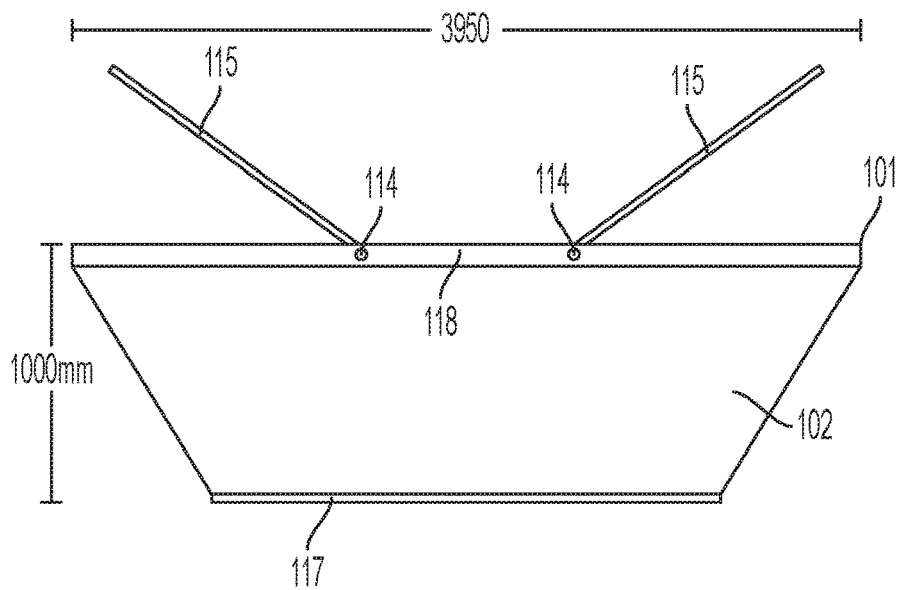
FIG. 3 shows a side elevation view of the unit.

With reference to FIG. 3, the container may comprise a length of between 3 and 5 m, such as approximately 3950 mm.

FIG. 3 illustrates the lid 112 of the container which may be selectively attached to the rim 118 of the container 101 in embodiments. The end panels 115 may pivot upward from the central panel 113 so as to allow access from either end of the container 101. When laid flat, the end panels 115 cooperate with the central panel 113 to enclose the container 101 for transportation and the like.

Figure 4:
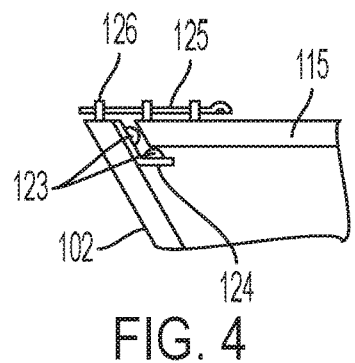
FIG. 4 shows a sealing and locking mechanism of a lid of the residue filtration unit in accordance with an embodiment.

FIG. 4 shows an embodiment wherein at least one gasket 123 seals against a distal edge of the end panel 115. In this regard, and L-plate 124 may attach to an inner surface of the container wall 102 and which may comprise end and undersurface gaskets 123 which interface an edge and an adjacent edge of the end panel 115 as shown.

A journal locking pin 125 may interface a distal eyelet 126 to lock the end panel 115.

Figure 5:
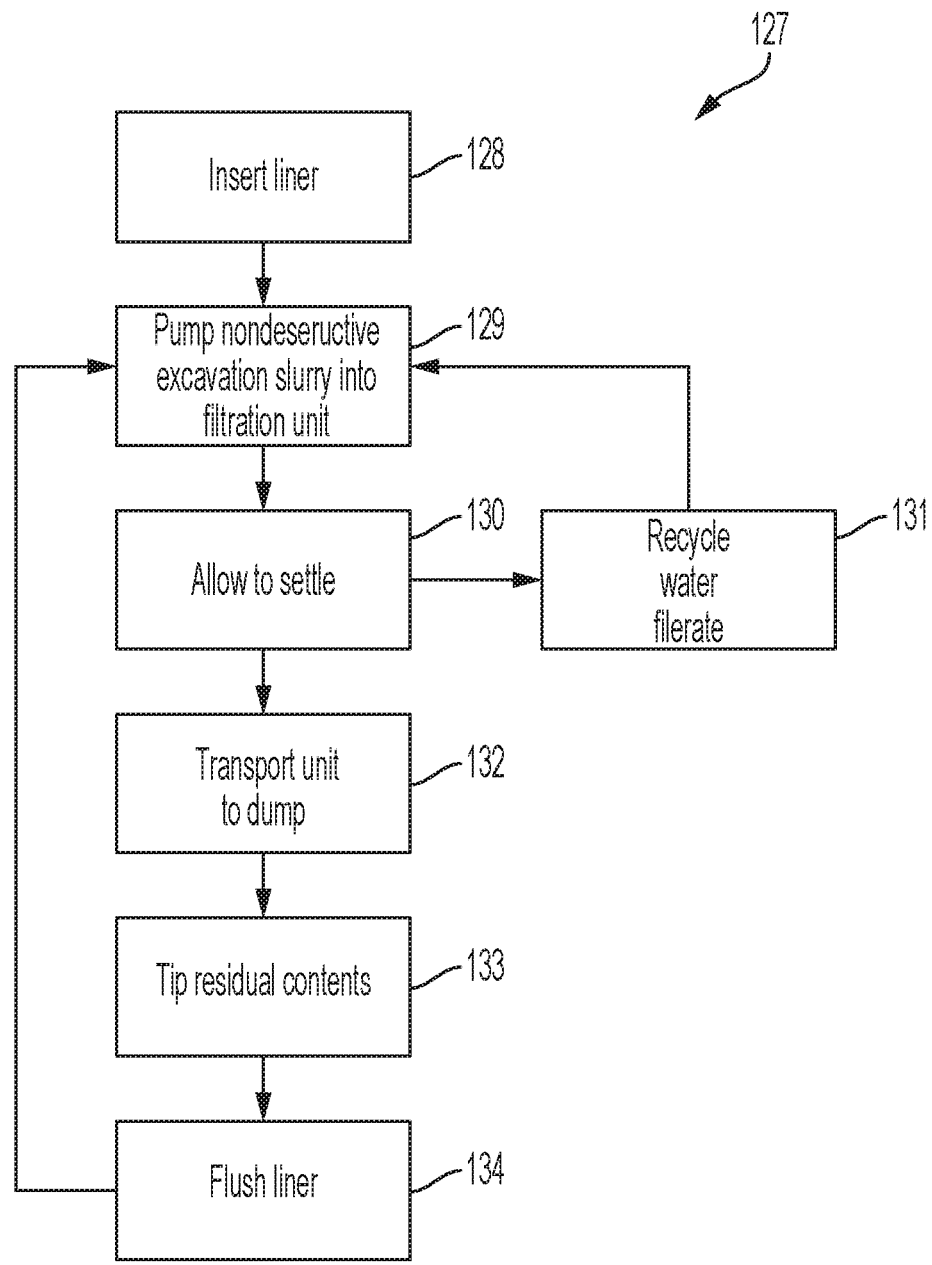
FIG. 5 shows a method of utilisation of the residue filtration unit during high-pressure non-destructive water excavation

FIG. 5 illustrates an exemplary method 127 of the utilisation of the unit.

The method 127 comprises obtaining the container 101 having the screen 107 affixed therein.

At step 128, the fabric filtration liner 127 is placed atop the screen 107. Edges of the fabric filtration liner 110 may comprise eyelets 111 which hook engagements 119 at the rim 118 of the container 101 to secure the edges.

At step 127 non-destructive high-pressure water excavation is conducted wherein residual liquid slurry 116 therefrom is pumped into the unit 110.

The slurry 116 is allowed to settle for some time (such as for more than 30 minutes) at step 160 wherein filtered water 121 drips or seeps through the fabric filtration liner 110 and screen 107 into the void 120.

The filtered water may be allowed to drain freely from the unit 101 via the drains 103. Alternatively, the filtered water may be collected via one or more drain hoses (not shown) connected to the drains 103 and recycled for the excavation at step 131.

Once the water content of the slurry 116 is reduced, the unit 100 is transported to a dump at step 132, such as by hosting the container 101 via the lifting lugs 105 atop a flatbed refused truck.

At step 133, the residual content therein is tipped from the container 101. In the embodiment where the unit 100 comprises the lid 102, a respective end panel 115 may open at a respective end to allow the contents to fall therefrom.

At step 134, the liner 110 may be optionally flushed with a high-pressure hose or alternatively washed for reuse again at step 129.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A water separating residue filtration unit comprising an outer container having container walls surrounding a container floor, a screen located within the container, the screen having a screen floor supported above the container floor, thereby defining an inner void between the screen floor and the container floor, at least one drain from the inner void and an exterior of the container and a fabric filtration liner covering the screen, wherein the screen floor is smaller than the container floor and wherein the screen walls are spaced away from respective inner surfaces of the container walls at the screen floor and the screen walls converge to meet the respective inner surfaces of the container walls towards the rim of the container.

2. The water separating residue filtration unit as claimed in claim 1, wherein the at least one drain comprises at least two drains located at opposite sides of the container floor.

3. The water separating residue filtration unit as claimed in claim 1, wherein the container floor is rectangular and wherein the at least one drain comprises four drains located at opposite corners of the container floor.

4. The water separating residue filtration unit as claimed in claim 1, further comprising engagements at a rim of the container to engage edges of the filtration liner.

5. The water separating residue filtration unit as claimed in claim 4, wherein the edges of the filtration liner comprise eyelets for removeable engagement of the engagements.

6. The water separating residue filtration unit as claimed in claim 1, wherein the container walls are planar and wherein the container has a trapezoidal cross section narrowing towards the container floor.

7. The water separating residue filtration unit as claimed in claim 6, wherein the screen has planar screen walls surrounding the screen floor, the screen walls at least partially covering inner surfaces of respective container walls.

8. The water separating residue filtration unit as claimed in claim 1, further comprising a supportive framework located between the screen floor and the container floor.

9. The water separating residue filtration unit as claimed in claim 8, wherein the supportive framework comprises an orthogonal arrangement of longitudinal and cross bars.

10. The water separating residue filtration unit as claimed in claim 9, wherein the supportive framework has a gap less than 30 cm between at least one of adjacent crossbars and longitudinal bars.

11. The water separating residue filtration unit as claimed in claim 1, further comprising a container lid, the container lid comprising a central panel and at least one end panel upwardly pivotable from the central panel.

12. The water separating residue filtration unit as claimed in claim 11, wherein the at least one end panel comprises two end panels located oppositely with respect to the central panel.

13. The water separating residue filtration unit as claimed in claim 11, further comprising a gasket interfacing an inner surface of the container wall and an edge of the at least one end panel.

14. The water separating residue filtration unit as claimed in claim 13, further comprising a locking pin between a rim of the container and the at least one end panel.

15. The water separating residue filtration unit as claimed in claim 1, further comprising at least one collection hose couple to the at least one drain.

16. The water separating residue filtration unit as claimed in claim 1, wherein the fabric filtration liner comprises nonwoven geotextile fabric.

17. A method of utilisation of a water separating residue filtration unit during high-pressure non-destructive water excavation as claimed in claim 1, the method comprising inserting the fabric filtration liner to cover the screen, pumping non-destructive high-pressure water excavation residual liquid slurry into the unit, allowing the slurry to settle such that water filters therefrom through the fabric filtration liner and the screen, transporting the unit to a dump and to be in the residual contents therefrom.

18. A method as claimed in claim 17, further comprising recycling the water from the at least one drain for the non-destructive high-pressure water excavation.

19. A method as claimed in claim 17, wherein the fabric filtration liner is a geotextile fabric that comprises at least one of a California bearing ratio (CBR) burst strength of greater than 1750 N and a flowrate @100 mm head of greater than 165 l/m²/s.

20. A water separating residue filtration unit comprising an outer container having container walls surrounding a container floor, a screen located within the container, the screen having a screen floor supported above the container floor, thereby defining an inner void between the screen floor and the container floor, at least one drain from the inner void and an exterior of the container and a fabric filtration liner covering the screen, wherein the container further comprises a container lid, the container lid comprising a central panel and two end panels upwardly pivotable from the central panel and located oppositely with respect to the central panel.

* * * * *